United States Patent [19]
Toshida et al.

[11] 3,773,149
[45] Nov. 20, 1973

[54] AUTOMOTIVE DISC BRAKE

[75] Inventors: Shunichi Toshida, Tokyo; Tadashi Kuroki, Yokohama; Nobutaka Someya, Tokyo; Tadashi Yano, Tokorozawa; Takashi Ozora, Tokyo, all of Japan

[73] Assignee: Nissan Motor Company, Yokohama, Japan

[22] Filed: May 10, 1971

[21] Appl. No.: 141,487

[52] U.S. Cl.............. 188/72.4, 188/72.5, 188/73.3
[51] Int. Cl........................................ F16d 55/224
[58] Field of Search.............. 188/72.4, 72.5, 73.4, 188/73.3

[56] References Cited
UNITED STATES PATENTS

| | | | |
|---|---|---|---|
| 3,428,152 | 2/1969 | Hoenick | 188/72.5 |
| 3,580,362 | 5/1971 | Falk | 188/73.4 |
| 3,621,946 | 11/1971 | Mori | 188/73.6 |
| R26,746 | 12/1969 | Hayes | 188/72.4 |
| 2,531,341 | 11/1950 | Meador, Jr. | 188/72.4 X |
| 3,363,727 | 1/1968 | Thirion | 188/73.4 |

FOREIGN PATENTS OR APPLICATIONS
968,898  9/1964  Great Britain .................... 188/72.5

*Primary Examiner*—George E. A. Halvosa
*Attorney*—McCarthy, Depaoli, O'Brien & Price

[57] ABSTRACT

A disc brake for a hydraulic brake system of a motor vehicle is disclosed, which includes as customary a braking disc rotatable with a vehicle wheel, directly and indirectly actuated friction pad assemblies located adjacent to both sides of the braking disc and forced against the braking disc when fluid under pressure is supplied to the disc brake from a master cylinder and a yoke which is adapted to carry the pressure of the fluid to the indirectly actuated friction pad assembly, in which the improvement mainly comprises provision of means which takes a braking torque on the friction pad assemblies during operation whereby the yoke is freed of a duty of bearing the torque and permitted to serve only to carry the pressure of the working fluid to the indirectly actuated friction pad assembly, resulting in a simplified construction and a streamlined operation of the disc brake.

4 Claims, 6 Drawing Figures

INVENTORS
Shunichi Toshida, Tadashi Kuroki, Nobutaka Someya,
Tadashi Yano & Takashi Ozora
BY
McCarthy, Depaoli, O'Brien & Price
ATTORNEYS

AUTOMOTIVE DISC BRAKE

This invention is generally concerned with a hydraulic brake system of a motor vehicle and has a particular reference to a disc brake for use in the brake system.

The disc brake in which the improvements according to this invention are to be incorporated is disclosed in the issued U. S. Pat. No. 3,245,500 patented Apr. 12, 1966.

The disc brake of the disclosed type uses a braking disc which is rotatable with a wheel of the motor vehicle and a stationary hydraulic cylinder which is open at both ends and which is secured to a stationary part adjacent to one side of the braking disc. Two opposed pistons are axially slidably fitted in the cylinder bore of the hydraulic cylinder, defining a fluid chamber therebetween. The fluid chamber communicates with a brake pedal operated master cylinder or other source of pressurized fluid and, when the brake pedal is depressed, the fluid under pressure is supplied to the fluid chamber for urging the pistons apart. A pair of friction pad assemblies are provided, one of which is interposed between the hydraulic cylinder and the adjacent face of the braking disc and the other is positioned adjacent the opposite face of the braking disc. The two pistons are respectively associated with the two friction pad assemblies in such a manner that one piston is in abutting engagement with one friction pad assembly to directly move the assembly toward the braking disc and the other piston is mechanically connected to the other friction pad assembly so as to move this assembly through the mechanical connection toward the disc. Such mechanical connection is provided by a yoke which is connected to the indirectly actuated friction pad assembly and on which the piston associated with the indirectly actuated friction pad assembly bears when moved by the pressurized fluid supplied into the fluid chamber. The yoke is provided with a central opening which is adapted to accommodate an adjacent arcuate portion of the braking disc and to form spaced side edges which are parallel to the axis of the braking disc. Two opposed grooves are formed in the sides of an extension of the stationary hydraulic cylinder and receive the respective side edges of the opening in the yoke for slidably guiding the yoke in a direction parallel to the axis of the disc.

The friction pad assemblies are forced against both faces of the braking disc when the pistons are moved apart by means of the pressurized fluid and, when this occurs, a braking torque is exerted on the friction pad assemblies due to the traction applied thereto. In this instance, the braking torque on the indirectly actuated friction pad assemblies is taken by the yoke which, in turn, transfers the torque to the stationary hydraulic cylinder. The yoke is thus used not only to carry the movement of the piston to the indirectly actuated friction pad assembly but to bear the braking torque exerted on this pad assembly.

For simplicity of construction and to streamline the operation of the brake, however, it is evidently desirable that the yoke be freed of a duty of bearing the braking torque and permitted to solely serve the purpose of carrying the movement of the piston to the indirectly actuated friction pad assembly.

Provision, moreover, of the side edges which are received in the opposed grooves in the extension of the stationary hydraulic cylinder is reflected by a relatively large outside diameter of the hydraulic cylinder and by restrictions which are encountered in bending or press-machining the yoke during production.

It is, therefore, a primary object of this invention to provide a disc brake in which the yoke is freed of the duty of receiving the braking torque on either of the friction pad assemblies and accordingly permitted to solely serve the purpose of carrying the movement of one of the pistons to the indirectly actuated friction pad assembly. The disc brake according to this invention thus features a simplified construction and streamlined operation. As a means to achieve this particular object, the invention proposes to incorporate a stationary support structure which is connected to the hydraulic cylinder or to any stationary member of the motor vehicle. The support structure is provided with an opening defining opposed internal side faces which confront side edges of the directly and indirectly actuated friction pad assemblies which consequently bear at their side edges against the opposed side faces of the support structure when the friction pad assemblies are forced against the faces of the braking disc. The braking torques on the friction pad assemblies are in this manner transferred to the stationary support structure. The stationary support structure may be secured to the hydraulic cylinder where the hydraulic cylinder is fast on a stationary member of the motor vehicle. Where the hydraulic cylinder having a bottom wall is movable, the support structure may be secured directly to the stationary member of the motor vehicle. In this instance, means may be provided which is adapted to support and guide the hydraulic cylinder.

A secondary object of this invention is to provide a disc brake from which the cooperating side edges and grooves provided for slidably guiding the yoke can be removed where desired thereby to reduce the outside diameter of the hydraulic cylinder and to facilitate bending or press-machining of the yoke during production.

A further secondary object of this invention is to provide a disc brake in which arrangements are made so that an easy access to the friction pad assemblies is provided to facilitate inspection and replacement of the friction pad assemblies. This will prove advantageous for timely and easy maintenance and servicing of the disc brake.

Some practical forms of the disc brake in accordance with this invention are illustrated by way of example in the accompanying drawings, in which.

Figure 1:
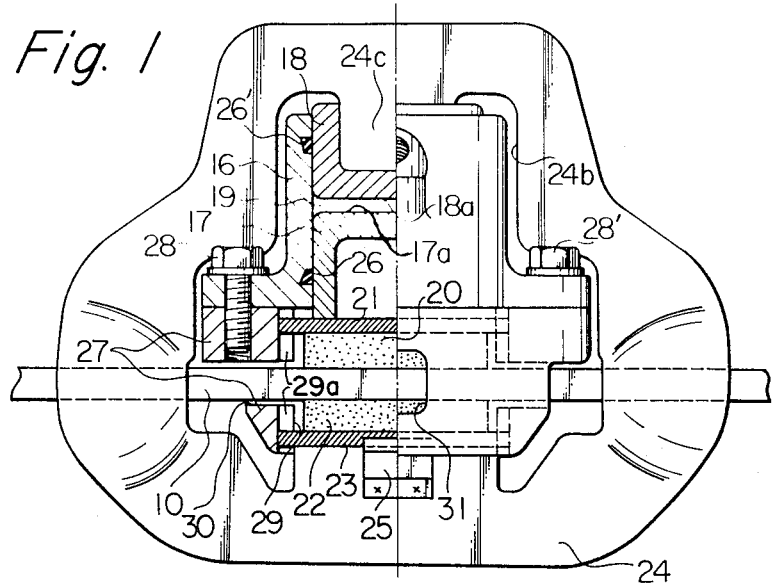
FIG. 1 is a view illustrating in section in the left half and in plan in the right half one form of the disc brake according to the invention.
Figure 2:
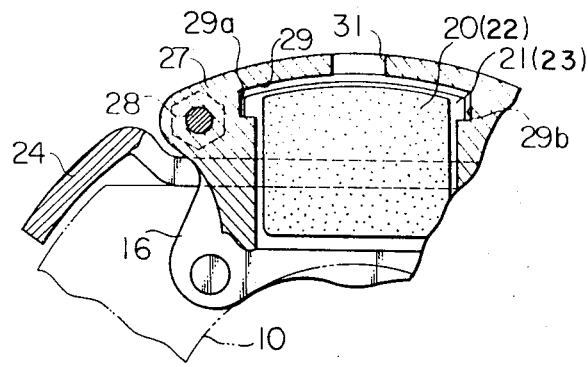
FIG. 2 is a plan view, partly in section, of a portion of the disc brake shown in FIG. 1.
Figure 3:
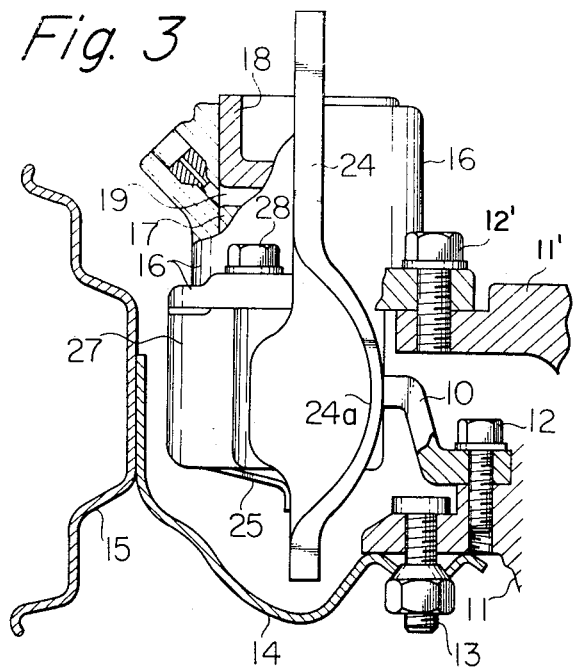
FIG. 3 is a cross sectional view of the disc brake shown in FIG. 1.

Reference is now made to the drawings and particularly to FIGS. 1 to 3 showing a first preferred embodiment of this invention in which the improvements are made over the disc brake disclosed by the previously named issued U. S. Pat. No. 3,245,500. Though not shown, the disc brake is used in conjunction with a brake pedal operated master cylinder or other suitable source of fluid under pressure so as to apply brakes to the wheels of a motor vehicle.

As illustrated, the disc brake includes a rotatable braking disc 10 which is mounted for rotation with the wheel through mechanical connections including, for instance, a member 11, bolts 12 and 13, a wheel disc 14 and a rim 15 of the wheel. Adjacent an inner face of the braking disc 10 is positioned a hydraulic cyliner 16 which, in this embodiment, is held stationary through rigid connection with a stationary structural member 11' through suitable fastening means such as a bolt 12'. This is best seen in FIG. 3. As best seen in FIG. 1, the stationary hydraulic cylinder 16 is open at both ends and positioned to have its axis substantially parallel to the axis of the braking disc 10. Inner and outer pistons 17 and 18, respectively, are axially slidably fitted in the cylinder bore of the stationary hydraulic cylinder 16. The pistons 17 and 18 have opposed walls 17a and 18a, respectively, so as to define a fluid chamber 19 therebetween. The fluid chamber 19 communicates with the master cylinder (not shown) so that fluid under pressure is supplied thereto when the brake pedal is depressed, whereby the pistons 17 and 18 are urged apart from each other.

Directly and indirectly actuated friction pad assemblies are positioned adjacent the faces of the braking disc 10. The directly actuated friction pad assembly is interposed between the braking disc 10 and the stationary hydraulic cylinder 16 and comprises a friction pad 20 and a backing plate 21 to which the friction pad is bonded or otherwise secured. The inner piston 17 is thus in abutting engagement with the inner face of the backing plate 21. The indirectly actuated friction pad assembly is positioned adjacent the opposite side of the braking disc 10 and comprises a friction pad 22 and a backing plate 23 secured thereto. The backing plates 21 and 23 may preferably have larger areas than the respective friction pads 20 and 22, as illustrated.

The stationary cylinder and the friction pad assemblies are housed in a yoke 24 which is generally a flat plate and which is partly raised as at 24a (FIG. 3) to accommodate the adjacent arcuate portion of the braking disc 10. The yoke 24 has a suitably shaped opening 24b which forms a generally rectangular tongue 24c. The tongue 24c is adapted to be received in the outer piston 18 so that the bottom wall 18a of the piston bears against the forward end of the tongue 24c. An interlocking member 25 is mounted on the yoke 24 and connected to the backing plate 23 of the indirectly actuated friction pad assembly, which is consequently interlocked with the yoke 24. Designated by reference numerals 26 and 26' are sealing rings which are mounted between the hydraulic cylinder 16 and the two pistons 17 and 18.

When, now, the brake pedal is depressed and the fluid under pressure is supplied from the master cylinder into the fluid chamber 19 between the opposite walls 17a and 18a of the inner and outer pistons 17 and 18, respectively, then the pistons are moved apart from each other by means of the fluid pressure. The inner piston 17 thus presses upon the backing plate 21 of the directly actuated friction pad assembly, forcing the friction pad 20 against the braking disc 10. The outer piston 18, on the other hand, is moved away from the inner piston 17 and bears upon the forward end of the tongue 24c of the yoke 24. The yoke 24 is accordingly moved in the direction of movement of the outer piston 18 with the result that the indirectly actuated friction pad assembly is moved toward the braking disc 10. The braking disc 10 is in this manner powerfully gripped by the two friction pads 20 and 22, to apply brake to the wheel.

According to this invention, now, a support structure 27 is provided, which is securely mounted on the stationary hydraulic cylinder 16 by suitable fastening means such as bolts 28 and 28'. The support structure 27 has formed therein an opening 29 which is so configured as to substantially follow the outline of the friction pad assemblies to receive therein the pad assemblies as clearly seen in FIG. 2. The opening 29 may include two opposed guide grooves 29a and 29b receiving the side edges of the backing plates 21 and 23 of the directly and indirectly actuated friction pad assemblies, respectively, so that the pad assemblies are guided when moved toward and away from the braking disc 10. The support structure 27 may also have formed therein a slot 30 which is adapted to accommodate the adjacent arcuate portion of the braking disc 10.

When the friction pad assemblies are forced against the faces of the braking disc during braking action, the pad assemblies are subjected to traction due to the braking torque applied thereto from the braking disc and, as a result, the backing plates 21 and 23 are forced against either of the side edges forming the opening 29. The braking torque is thus taken by the support structure 27 and is passed therethrough to the stationary hydraulic cylinder 16, while the yoke 24 isolated from the torque at any instant. The yoke 24 is in this manner permitted to lend itself to solely carrying the movement of the outer piston 18 to the indirectly actuated friction pad assembly.

If desired, a slot 31 having a width in an axial direction related to the combined axial thickness of the braking disc and the two friction pad assemblies so as to provide a visual access to the pad assemblies may be formed in the support structure 27 to facilitate inspection of the pads and backing plates. When the friction pads are found to have worn out or to be destroyed, the friction pad assemblies can be replaced with new ones simply by unscrewing the bolts 28 and 28' to remove the support structure 27 from the cylinder 16.

Figure 4:
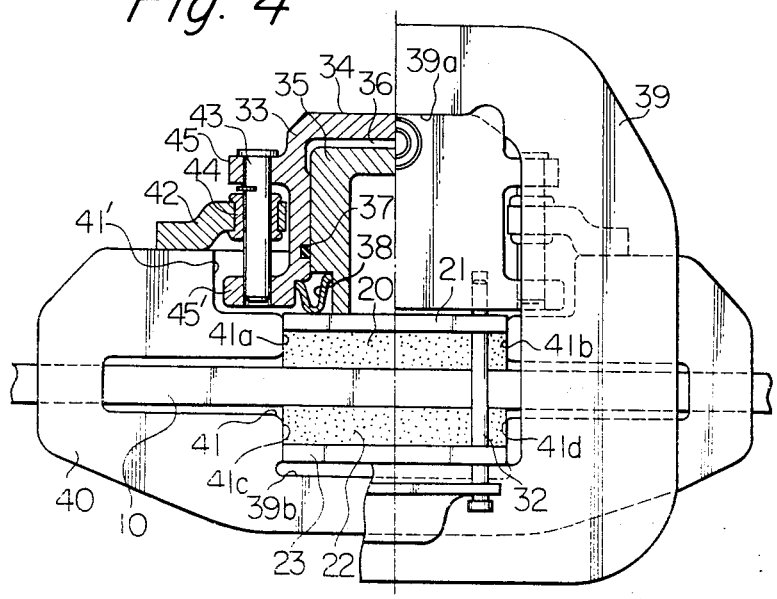
FIG. 4 is similar to FIG. 1 but shows another form of the brake according to the invention.
Figure 5:
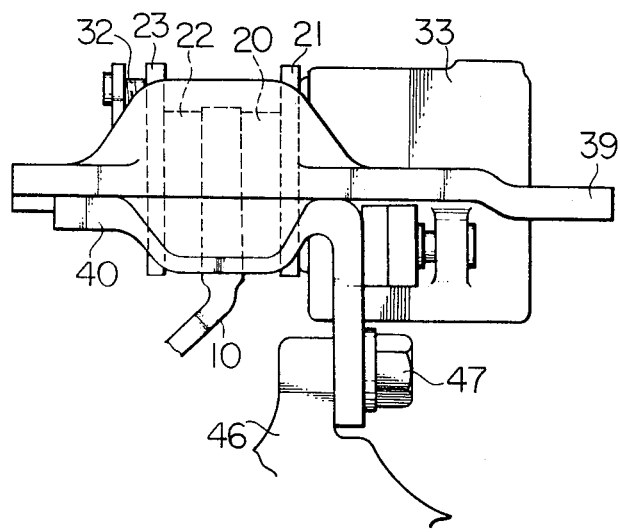
FIG. 5 is a side elevational view of the disc brake shown in FIG. 4.

Another form of the disc brake according to this invention is illustrated in FIGS. 4 and 5. This modified disc brake functions essentially similarly to the previously described form of the disc brake.

The disc brake of FIGS. 4 and 5 thus also includes directly and indirectly actuated friction pad assemblies surmounting both sides of a rotatable braking disc 10. The directly actuated friction pad assembly comprises a friction pad 20 and a backing plate 21, while the indirectly actuated friction pad assembly comprises a friction pad 22 and a backing plate 23, similarly to the counterparts of the disc brake of FIGS. 1 to 3. A guide pin 32 is passed through apertures formed in the backing plates 21 and 23, guiding the friction pad assemblies when the pad assemblies are moved toward and away from the braking disc.

In this modified form of the disc brake, a hydraulic cylinder which is now represented by numeral 33 is positioned adjacent to the inner face of the backing plate 21 of the directly actuated friction pad assembly. Working in the cylinder 33 is the piston, which is sealed by a sealing ring 37 housed in an annular groove in the cylinder bore and which is in abutting engagement with the backing plate 21. Between the bottom wall 34 of the cylinder 33 and an outer face of the piston 35 is defined a fluid chamber 36 which communicates with the master cylinder to receive therefrom fluid under pressure when the brake pedal is depressed. The pressurized fluid supplied into the fluid chamber 36 acts upon the cylinder 33 and the piston 35 which are consequently moved apart from each other. Designated by reference numeral 38 is dust-proofing seal means which may be provided at the innermost ends of the cylinder 33 and the piston 35 so as to preclude entrance of dust into the cylinder.

The cylinder and the friction pad assemblies are encased in a yoke 39. The yoke 39 is substantially centrally opened to form lengthwise edges 39a and 39b facing the outer face of the bottom wall 34 of the cylinder 33 and the outer face of the back plate 23 of the indirectly actuated friction pad assembly. With this arrangement, when the cylinder 33 is moved away from the piston 35 by the fluid pressure drawn into the fluid chamber 36 it bears at its outer face upon the lengthwise edge 39a of the yoke 39 so as to move the yoke in the same direction. The yoke 39, in turn, presses at its lengthwise edge 39b upon the backing plate 23 of the indirectly actuated friction pad assembly. The indirectly actuated friction pad assembly is consequently forced against the outer face of the braking disc 10. The directly actuated friction pad assembly, on the other hand, is moved to the braking disc 10 by the pressure exerted thereto by the piston 35 which is forced toward the braking disc by the fluid pressure in the fluid chamber 36.

The disc brake of FIGS. 4 and 5 now further includes a support structure by which the cylinder 33 is supported and guided when moved.

The support structure comprises a stationary support member 40 having formed therein recesses 41 and 41'. The recess 41 not only accommodates the arcuate portion of the braking disc 10 but receives therein the friction pad assemblies in a manner to permit the pad assemblies to move in a direction parallel to the axis of the braking disc 10. The recess 41', on the other hand, accommodates therein the cylinder 33. More specifically, the recess 41 defines a pair of opposite side edges 41a and 41b for abutting engagement with the sides of the directly actuated friction pad assembly and a pair of opposite side edges 41c and 41d for engagement with the sides of the indirectly actuated friction pad assembly, as shown. Arms 42 are is secured to the support member 40 and extends toward the hydraulci cylinder 33. Each arm 42 has formed in its free end portion an aperture (not numbered) into which a guide pin 43 is slidably inserted through a bushing 44 which may be made of elastic material such as rubber. The guide pin 43 is directed in parallel to the direction of movement of the cylinder 33 and rigidly connected thereto. The pin 43 is herein illustrated as secured to the cylinder 33 through limbs 45 and 45' extending from the cylinder. The support number 40 is rigidly secured to a suitable stationary member 46 of the motor vehicle through suitable fastening means such as for instance a bolt 47 as seen in FIG. 5.

With the support structure arranged in this manner, when the friction pad assemblies are forced against the braking disc 10 to apply brakes, the pad assemblies are caused to bear against either the side edges 41a and 41c or 41b and 41d of the support member 40 depending on the direction of rotation of the braking disc. The braking torque imparted to the friction pad assemblies due to traction by the braking disc 10 is taken by support member 40 which, in turn, transfers the torque to the stationary member 46 of the motor vehicle. The yoke 39 is therefore liberated from a duty of taking such braking torque during the braking operation and is permitted to solely contribute to carrying the movement of the cylinder 33 to the indirectly actuated friction pad assembly.

The use of the rubber bushing 44 to retain the guide pin 43 will prove beneficial for efficient movement of the cylinder 33 because of its elasticity that urges the guide pin 43 to return in a direction opposite to the direction in which the guide pin has been moved with the cylinder by the fluid pressure.

The space over the friction pad assemblies is open in the disc brake shown in FIGS. 4 and 5 to provide an easy access to the pad assemblies, facilitating inspection and replacement of the pad assemblies. The pad assemblies can be removed and replaced with new ones simply by removing the guide pin 32 from the assemblies. Provisions of such open space over the pad assemblies will also prove advantageous for the purpose of dissipating the heat evolved in the friction pads and the braking disc due to friction therebetween.

It will now be appreciated from the foregoing description that the first and second forms of the disc brake according to this invention are usefull especially where a simplified construction and a streamlined smooth operation of the disc brake is a matter of concern. With the arrangements of the disc brake hereinbefore described, it is no longer necessary that the cylinder 16 or 33 be provided with a guide groove to engage the longitudinal side edge of the central opening which is formed in the yoke. This is advantageous not only for reducing the outside diameter of the hydraulic cylinder but for simplifying the internal and external outlines of the yoke. The yoke thus features a compact construction and is adapted for being bent or press-machined during production.

A primary feature of the disc brake according to this invention is, as previously discussed, that the yoke is not required to take the braking torque on the friction pad assemblies. This feature can be maintained even in a disc brake using a yoke which slides on a stationary member because no torque is transferred to the yoke through the sliding engagement between the yoke and the stationary member. An example of a disc brake of this character is illustrated in FIG. 6.

Figure 6:
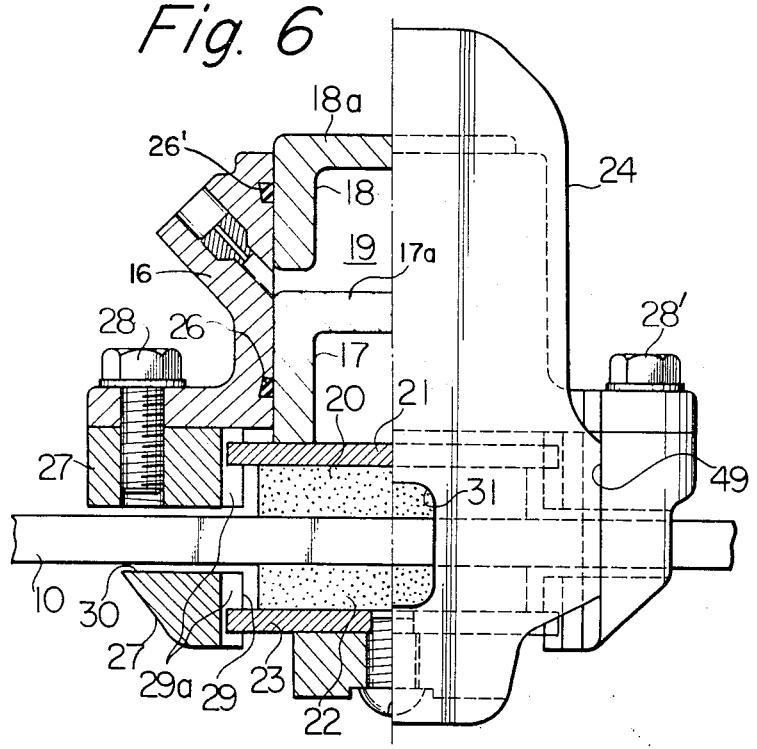
FIG. 6 is also similar to FIG. 1 but shows still another form of the disc brake according to the invention.

The disc brake shown in FIG. 6 is shown, by way of example, as a modification of the disc brake of FIGS. 1 to 3 and, as such, like reference numerals are assigned to corresponding members.

In the disc brake herein shown, the outer piston 18 is shown to be inverted to define the fluid chamber 19 between its cavity and the opposite wall of the inner piston 17 and a bear against the internal lengthwise edge of the yoke 24 at its outermost wall 18a.

The support structure 27 is now provided with a guide groove 49 which extends in a direction substantially parallel to the axis of the braking disc 10. Likewise, the yoke 24 has formed on its external side edge a straight sliding surface 50 which is received in the guide groove 49. The yoke 24 is thus guided by the groove 49 when moved in a direction parallel to the axis of the braking disc 10. In this instance, the braking torque on the friction pad assemblies is transferred to the stationary hydraulic cylinder 16 through the support structure 27 and, as a consequence, the yoke 24 is completely isolated from such torque.

We claim:

1. A disc brake for motor vehicle hydraulic brake system, comprising:
   1. a braking disc rotating with a wheel of the motor vehicle;
   2. a hydraulic cylinder having a bottom wall;
   3. a piston slidable in opposite directions which are substantially parallel to an axis of said braking disc, said piston and said cylinder defining a fluid chamber into which pressurized fluid is supplied when a braking action is to be initiated;
   4. directly and indirectly actuated friction pad assemblies surmounting both sides of said braking disc, said directly actuated friction pad assembly being in abutting engagement with said piston and thereby forced against said braking disc when said piston is moved by said pressurized fluid;
   5. a yoke movable in a direction parallel to said axis of said braking disc and carrying the movement of said cylinder to said indirectly actuated friction pad assembly for forcing said indirectly actuated friction pad assembly against said braking disc when said cylinder is moved by said pressurized fluid, said yoke having a lengthwise edge which bears against said bottom wall of said cylinder;
   6. a guide pin being passed through apertures formed in backing plates of said friction pad assemblies for guiding said friction pad assemblies when said friction pad assemblies are moved toward and away from said braking disc; and
   7. a stationary support structure for supporting and guiding said hydraulic cylinder, said support structure comprising a stationary support member having formed therein recesses and secured to a stationary member of the motor vehicle, one of said recesses accommodating an arcuated portion of said braking disc and receiving therein said friction pad assemblies, while the other accommodating therein said cylinder, arms secured to said support member and having an aperture formed at its free end portion, and guide pins secured to said cylinder and extending in a direction parallel to the direction of movement of said cylinder, each guide pin being slidably passed through said aperture in said arm for supporting, and guiding said cylinder when said cylinder is moved.

2. A disc brake according to claim 1, wherein said support structure further comprises rubber bushings, each of which is secured in said aperture in said arm.

3. A disc brake according to claim 1, wherein said yoke is open over said friction pad assemblies.

4. A disc brake according to claim 1, wherein dust-proofing seal means is provided at the innermost ends of said cylinder and said piston so as to preclude entrance of dust into said cylinder.

* * * * *